J. R. OLDHAM.
SHIP AND SHIP'S HATCH.
APPLICATION FILED JAN. 26, 1909.

956,152.

Patented Apr. 26, 1910.

2 SHEETS—SHEET 1.

WITNESSES:
F. B. Evarts
J. H. Maitland

INVENTOR
Joseph R. Oldham

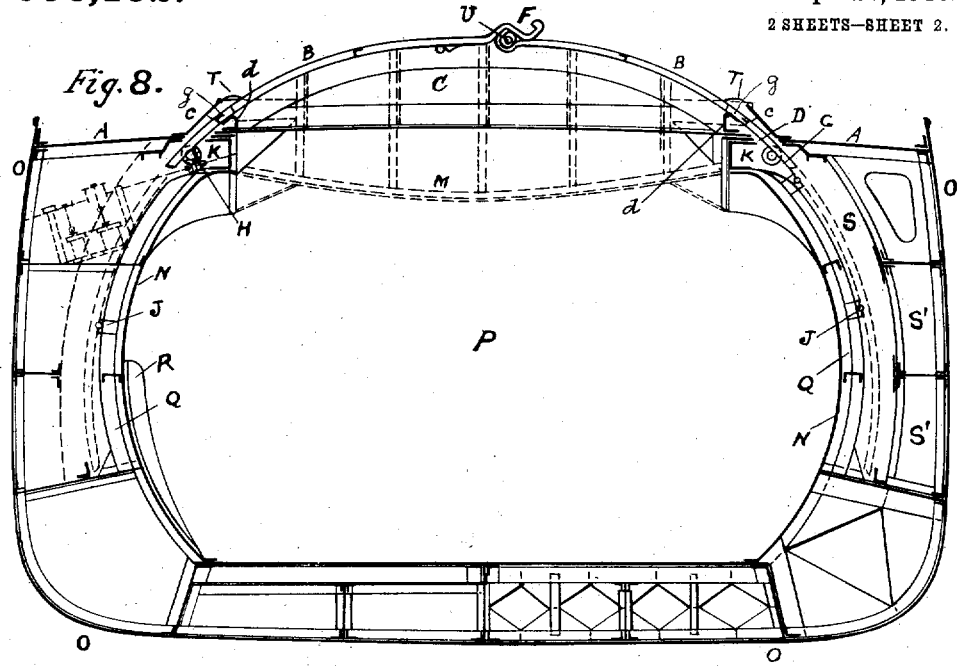
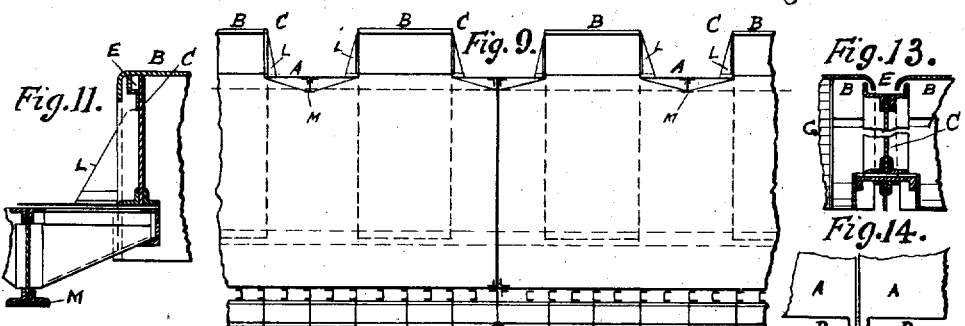
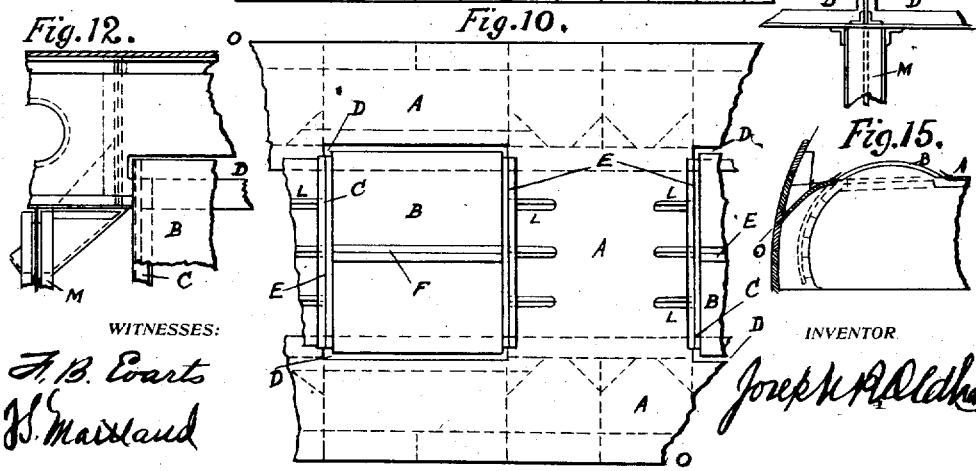

UNITED STATES PATENT OFFICE.

JOSEPH R. OLDHAM, OF CLEVELAND, OHIO.

SHIP AND SHIP'S HATCH.

956,152.  Specification of Letters Patent.  Patented Apr. 26, 1910.

Application filed January 26, 1909. Serial No. 474,315.

*To all whom it may concern:*

Be it known that I, JOSEPH R. OLDHAM, a citizen of the United States, residing at Cleveland, in the county of Cuyahoga and State of Ohio, have invented new and useful Improvements in Ships and Ships' Hatches, of which the following is a specification.

My invention relates to improvements in the construction of steel vessels designed chiefly for carrying loose ore or other bulk cargoes, and has for its object the construction of a stronger and more efficient vessel than has hitherto been built, having what I denominate gyratory or slidable hatches which open and close hatchways about as large as are now commonly constructed, but with fewer hatch units, which shall be clear of the decks when loading or discharging cargo and stow away in water-tight wing compartments, or chambers, below decks, forming a strong and unencumbered cargo hold while screening and protecting said hatches from injury by cargo in the holds or on deck, or by the grab-buckets, or other cargo handling mechanisms. In this novel construction the vessel has a concave inner skin, when considered from the main hold or center of the hull, forming hatch-chambers, with curved frames extending down to the upper bottom, to which they are strongly riveted and made water-tight to prevent leakage from the hatchways into the main cargo holds. The upper extension of this inner skin merges into inwardly projecting cells, which I denominate rack-alleys, as they are devised to accommodate the racks, shafting, and gearing for operating the hatches and form a base for the attachment of short hatchway girders below decks. This system of wing chambers makes a strong hull without their being any direct connection between the inner and outer skins for the full length and breadth of the individual hatches, to permit of their free movement from about the level of bilges to the slotted decks and nearly from end to end of the holds. I attain these objects by the structural device and mechanism illustrated in the accompanying drawings, in which—

Figure 1:
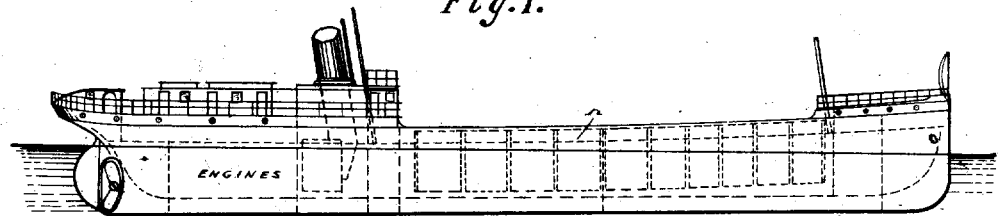
Figure 2:
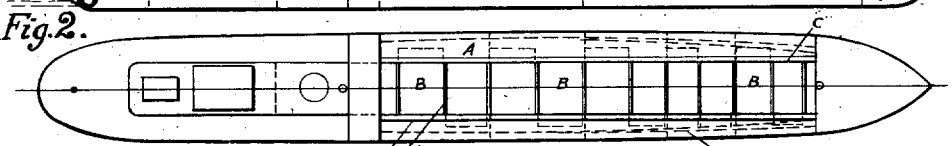
Figure 3:
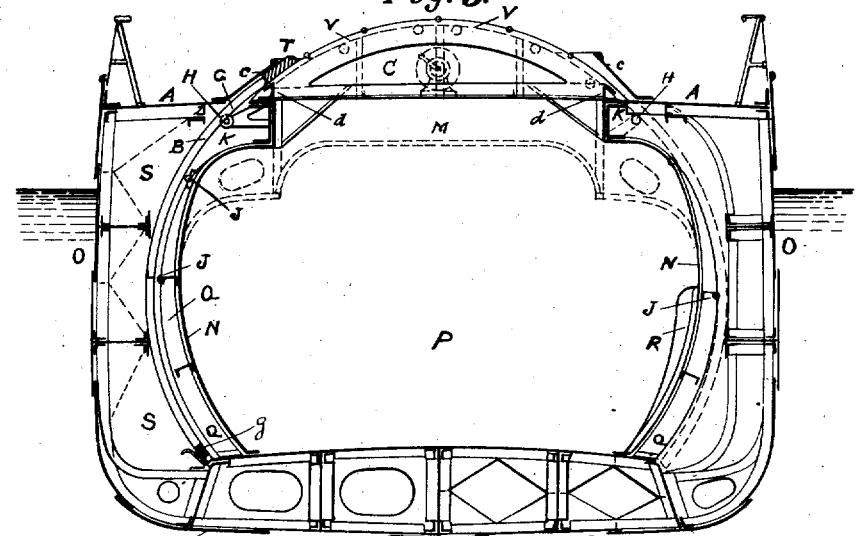
Figure 5:
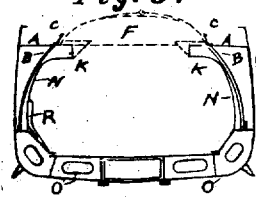
Figure 4:
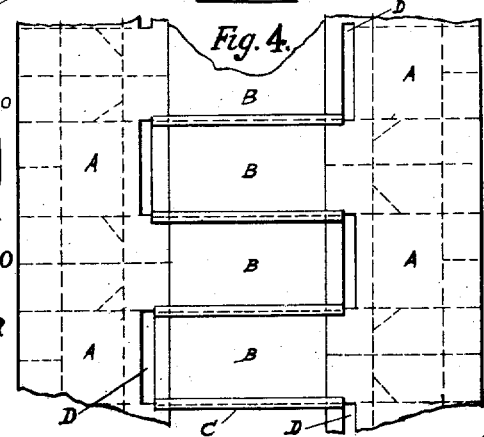
Figure 7:
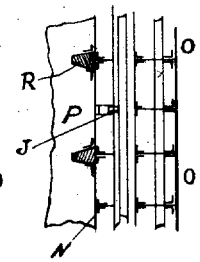
Figure 6:

Figure 1 is a profile of a salt water vessel arranged with a number of single hatches. Fig. 2 is a plan view of same. Fig. 3 is a transverse section with hatches open. Fig. 4 is a fragmentary deck plan showing slots in deck and transverse coamings before the longitudinal coamings are fitted. Fig. 5 is a midship section near the center of a hatchway. Fig. 6 is a fragmentary section at apex of hatches when slightly open. Fig. 7 is a fragmentary longitudinal section showing fenders to protect the inner skin of the hatch chambers. Fig. 8 is a transverse section of a large lake vessel with twin hatches closed. Fig. 9 is a partial longitudinal section showing widely spaced hatches. Fig. 10 is a fragmentary plan view of same. Fig. 11 is a partial vertical longitudinal section through transverse hatch coamings. Fig. 12 is a plan view of same. Fig. 13 is a section through transverse coamings showing two hatches in the gutter waterway or channel. Fig. 14 is a plan of same. Fig. 15 shows a small hatch passing through a protective deck.

Similar letters refer to similar parts throughout the several views.

In this novel construction the vessel has a deck A, hatches B, transverse coamings C, longitudinal coamings $c$, slots in the deck D, inner coamings $d$, gutter E.

F shows my device on the upper margins of double hatches for making automatic water-tight joints. These are so formed that when the ends come together the projection of one will rise over the cavity of the other, which cavity may be fitted with a rubber hose or gasket to insure a perfectly water-tight joint. These corrugations are formed of such an angle that they will slide apart by a slight pull on the rack or wire cable. The projection and cavity will be flattened at the sides to correspond with the downwardly depending flanges at the channels or gutters. These overlapping joints or corrugations may also be formed by a steel casting riveted to the plates.

To move the hatches in or out of the wing compartments, to open and close the hatchways, I fix a rack G, circumferentially on the inner side of the hatchways, or two racks for a large or heavy hatch. The racks strengthen the hatches and near to their ends bars or pieces of wood $g$, are fitted longitudinally, forming a flush surface to bear against the inner coamings and make a grain tight connection with a portable hatch bar of partially wedge shaped section, which is placed between the outside of the hatch and the longitudinally extending coamings, thus making tight joints on both sides of the hatches. Working onto these racks are pinions H. Near to the deck and within the projections of the inner skin, these are keyed onto a shaft which extends longitudinally through the rack alleys K, from end to end of the series of hatches, which move on rollers J. These shafts may extend from the forecastle to the after end by using flexible couplings, or universal joints, and they may be revolved by large engines in the engine and boiler space, or at the bow or stern, but by preference, they will be actuated by electric motors or hydraulic engines placed in the adjoining compartments to the hatch chambers, when a worm gearing will revolve the shaft. Pulleys or drums may also be placed on this shaft to pull the hatches up from opposite sides at the same speed as that at which the worm and wheel are working. Hatches may also be operated by a winch on deck pulling wire ropes working in sheaves near the peripheries of the deep coamings. Coaming brackets L are fitted to connect with the transverse girders M. The deep coamings diminish to a point at the inside of the slots in the deck, but the girders beneath the deck are fitted between pairs of coamings, when these are widely spaced, to transmit the central strength of the coamings beyond the slots, by being strongly connected to the inwardly projecting cells in the upper part of the chambers, and longitudinal bracket plates extend in either direction from the girders below deck to the deep coamings and are riveted through the deck to their vertical brackets or knee plates.

The space between the inner skin N and the outer skin O is divided longitudinally into many hatch chambers by bulkheads or partitions. When the hatches are widely spaced, say twenty-four feet centers, or when the hatches are single or in one length circumferentially, there will be compartments suitable for holding cargo between pairs of hatch-chambers. When the hatches are very small, two or more hatches may be inclosed in one chamber. The main hold is designated P. As there is no direct connection between the outer and inner skins within the hatch chambers, between the deck beams and the upper bottom, the inner skin will be of extra strength and supported by strong web frames Q mounted with rollers curved to correspond with and to serve as bearers for the curved hatches.

To screen the hatch chambers and strengthen the deck along the slots, inclined coamings are fitted longitudinally. These are connected to the transverse coamings, and on top of the inner skin and inside of the slots, strong inner coamings, beveled to the angle of the hatches, are fitted to make a tight joint on the under side of hatches and to strengthen the slotted decks.

In vessels which may be unloaded by such mechanism as the Hulett hydraulic or electric machines, I fit vertically extending fenders R on the inner side of the hatch compartments to protect them from injury by the unloading mechanism. These hatch-chambers S may be entered through doors in the bulkheads from either end of the vessel, from the deck, or through manholes in the upper part of the inner skin.

Portable hatch bars are marked T, gaskets U, wire rope V.

On the Great Lakes modern steamers are commonly constructed with steel hatches numbering over three hundred and seventy pieces in each vessel. When these are opened they largely encumber the decks and are in danger of being injured. By my invention, the hull is so constructed that the hatches for a large steamer will number only about thirty-six when widely spaced and about seventy when closely spaced, while in a small foreign ore carrier, with hatches made in one piece to each hatchway, or division, the number will seldom exceed ten or a dozen in one vessel. These hatches, whether single or twin, are of concave form when viewed from the main holes, and can be easily opened and closed by the novel mechanism devised by me. They will be water tight without tarpaulins and will not be exposed to injury when the hatchways are open.

By this device the decks will not be encumbered with hatches during loading or unloading of cargo, and any leakage over the hatchways, due to straining, will flow into the hatch chambers or bilges and not injure cargo in the holds.

In small vessels, or when the hatches are closely spaced, with only transverse coamings between them, transverse girder connections below decks, between the projections of the inner skins, may be omitted, as the transverse coamings will then be bracketed to the rack alleys. With these small hatches, alternate transverse coamings, may be portable. In cargo vessels having hatchways of great length in a fore and aft direction, and comparatively narrow athwartships, say not exceeding half the breadth of the hull, each hatch will generally be from about nine feet to about twelve feet in length fore and aft, and will be made in one piece circumferentially, adjoining hatches being operated from opposite sides of the hull, thus forming hatch chambers under slotted decks and chambers without slots in the deck adjoining each other. With this arrangement, as with widely spaced hatches, alternate compartments will have the outer and inner skins directly and strongly connected, as necessary, from the bottom to the deck. There being no aperture in the deck over these alternate compartments, knee, or bracket plates are fitted to transmit the augmented rigidity over the hatch chambers.

It will be economical to arrange the hatch slots and inner margins of rack alleys in straight, parallel lines fore and aft, but the lower part of the inner skin may taper toward the ends of the vessel to coincide with the upper bottom which generally conforms to the shape of the hull.

The hatches will be made of steel or other suitable metal, such as aluminum, and their area and thickness may vary greatly. For a modern Great Lakes vessel the hatches will preferably be in pairs transversely, and of a length, from the deck to the center of the deep coamings, of about twenty two feet, thickness about one-quarter of an inch when made of steel. The hatches in a war ship or reserve merchant cruiser will be as strong as the protective deck plate.

Having thus fully described my invention, what I claim is:—

1. In a bulk cargo vessel having a steel deck, the combination of transverse hatch coamings having channels or gutters on their peripheries, which rise on a curve from the decks at the sides of the hatchways; longitudinal slots in the deck near said sides, inwardly inclined longitudinal coamings at the sides of said slots, hatch chambers at the sides of the holds communicating with said slots, curved metal hatches adapted to slide or ride on rollers along said transverse coamings and through said slots into said hatch chambers, and portable hatch bars adapted to be fitted between said inclined coamings and the outside of the curved hatches to prevent water leaking into the hatch chambers, in which said hatches are housed when moved off the transverse coamings which support them, all substantially as set forth.

2. A steel ship having longitudinally straight and transversely curved metal hatches with downwardly depending flanges, curved transverse coamings on which said hatches are adapted to be seated, girders and longitudinal brackets or knee plates beneath the deck for supporting said coamings, curved frame members mounted with rollers forming a regular curved path for the hatches below the rack-alleys, which project inwardly from the upper part of the inner skin, so that the hatches can readily be lowered into said chambers, extending fore and aft on either side of the holds, to open the hatchways, without encumbering either the decks or main holds, and be raised again by suitable mechanism onto said transverse coamings to which they are secured and made watertight by gaskets and hatch bars, substantially as and for the purpose specified.

3. In a steel vessel with holds and hatchways suitable for bulk cargoes, the combination of curved transverse coamings with curved hatches adapted to be seated on the coamings, frame members below the deck curved in continuation with the curvature of the coamings, an inner skin on said frame members forming hatch chambers between the inner skin and the side of the vessel, rollers on said frame members, slots in the deck for the reception of the hatches, rack alleys projecting inwardly from the upper part of the inner skin, shafting and gearing in said alleys, connected to the hatches, for moving them through the slotted decks to open and close hatchways, all substantially as set forth.

4. In ship construction the combination of inclined longitudinal coamings and grooved curved transverse coamings, curved hatches adapted to be seated on said transverse coamings, frame members below the deck curved in continuation with the curvature of the coamings, an inner skin on said frame members, hatch chambers between the outer and inner skins of the ship, rollers mounted on said frame members, slots in the deck for the reception of the hatches, rack alleys projecting inwardly from the upper part of the inner skin, beveled inner coamings, shafting and gearing in said alleys connected to the hatches for moving them through the slotted deck to open and close the hatches which are pressed tight by portable hatch bars, between their outer surface and the inclined longitudinal coamings, all substantially as set forth.

5. In a bulk cargo vessel having a steel deck and large hatchways, the combination of curved metal hatches having corrugated longitudinal margins forming automatically watertight connections near the apex of said hatches, which are adapted to be seated on transverse coamings fitted with double channels along their upper margins, frame members curved below the rack alleys in continuation with the curvature of the coamings, an inner skin on said frame members forming hatch chambers between the inner skin and the sides of the vessel, rollers mounted on said frame member slots in the deck for the reception of the hatches, rack alleys projecting inwardly from the upper part of the inner skin and connected together by transverse girders, shafting and gearing in said rack alleys connected to the hatches for moving them through the slotted decks to open and close the hatchways by suitable mechanism all substantially as set forth.

6. In a vessel having a protective deck, longitudinally straight and transversely curved metal hatches as strong as said protective deck, adapted to be seated on curved transverse coamings, frame members below the deck curved in continuation with the curvature of the coamings, an inner skin on said frame members forming a hatch chamber between the inner skin and the side of the vessel, slots in the deck for the reception of the hatches, which are moved diagonally through said slots by suitable mechanism to open and close the hatchways, all substantially as set forth.

7. In a ship or vessel having curved metal hatches, curved transverse coamings on which said hatches are adapted to be seated, girders and longitudinal brackets or knee plates beneath the deck for supporting said coamings, frame members below the deck curved in continuation with the curvature of the coamings, an inner skin on said frame members forming hatch chambers between the inner skin and the sides of the vessel, slots in the deck for the reception of the hatches which are fitted with longitudinally extending bars for strengthening and filling the cavity formed by the racks on the inner side of hatches, to form a flush surface to bear against the inner coamings, which are fastened along the edges of the slots in the deck for the reception of the hatches, rack alleys projecting inwardly from the upper part of the inner skin, shafting and hoisting mechanism in said alleys connected to the hatches for moving them through the slotted deck to open and close the hatchways by suitable mechanical power, all substantially as set forth.

8. In a ship or vessel having metal frames and deck members, the combination of curved transverse coamings with curved hatches adapted to be seated on said coamings, inner frame members below the decks curved in continuation with the curvature of the transverse coamings, an inner skin on said frame members forming hatch chambers between said inner skin and sides of the ship, said skin being supported by knees, bracket plates and longitudinal stringers so that a clear space is left between the deck and the bottom for housing the hatches, rollers mounted on said frame members, slots in the deck for the reception of the hatches, rack alleys projecting inwardly from the upper part of the inner skin, forming a base for securing the transverse girders and for inclosing the shafting and gearing connected to the hatches, for moving them through the slotted deck to open and close the hatchways, when actuated by suitable mechanism, all substantially as set forth.

9. In a ship or vessel having a steel deck and double bottom and a plurality of hatchways, the combination of curved metal hatches adapted to be seated on curved transverse coamings, frame members below the deck curved in continuation with the curvature of the transverse coamings, an inner skin on said frame members forming hatch chambers, protected by fenders, between the inner skin and the sides of the vessel, said inner skin being strengthened by bulkheads, girders and brackets, whereby a strong, unobstructed space, between the outer and inner skins is provided to permit of the free movement of the hatches between the coamings and the top of the double bottom, slots in the deck, screened and strengthened by longitudinal coamings, for the reception of the hatches, rack alleys projecting inwardly from the upper part of the inner skin, shafting in said alleys connected to the hatches for moving them on rollers through the slotted decks to open and close the hatchways when pulled by wire ropes actuated by suitable mechanism, all substantially as set forth.

JOSEPH R. OLDHAM.

Witnesses:
F. B. EVARTS,
J. S. MAITLAND.

---

Correction in Letters Patent No. 956,152.

It is hereby certified that in Letters Patent No. 956,152, granted April 26, 1910, upon the application of Joseph R. Oldham, of Cleveland, Ohio, for an improvement in "Ships and Ships' Hatches," an error appears in the printed specification, requiring correction as follows: Page 2, line 92, the word "holes" should read *holds;* and that the said Letters Patent should be read with this correction therein, that the same may conform to the record of the case in the Patent Office.

Signed and sealed this 26th day of July, A. D. 1910.

[SEAL.]

F. A. TENNANT,
*Acting Commissioner of Patents.* said frame members forming a hatch chamber between the inner skin and the side of the vessel, slots in the deck for the reception of the hatches, which are moved diagonally through said slots by suitable mechanism to open and close the hatchways, all substantially as set forth.

7. In a ship or vessel having curved metal hatches, curved transverse coamings on which said hatches are adapted to be seated, girders and longitudinal brackets or knee plates beneath the deck for supporting said coamings, frame members below the deck curved in continuation with the curvature of the coamings, an inner skin on said frame members forming hatch chambers between the inner skin and the sides of the vessel, slots in the deck for the reception of the hatches which are fitted with longitudinally extending bars for strengthening and filling the cavity formed by the racks on the inner side of hatches, to form a flush surface to bear against the inner coamings, which are fastened along the edges of the slots in the deck for the reception of the hatches, rack alleys projecting inwardly from the upper part of the inner skin, shafting and hoisting mechanism in said alleys connected to the hatches for moving them through the slotted deck to open and close the hatchways by suitable mechanical power, all substantially as set forth.

8. In a ship or vessel having metal frames and deck members, the combination of curved transverse coamings with curved hatches adapted to be seated on said coamings, inner frame members below the decks curved in continuation with the curvature of the transverse coamings, an inner skin on said frame members forming hatch chambers between said inner skin and sides of the ship, said skin being supported by knees, bracket plates and longitudinal stringers so that a clear space is left between the deck and the bottom for housing the hatches, rollers mounted on said frame members, slots in the deck for the reception of the hatches, rack alleys projecting inwardly from the upper part of the inner skin, forming a base for securing the transverse girders and for inclosing the shafting and gearing connected to the hatches, for moving them through the slotted deck to open and close the hatchways, when actuated by suitable mechanism, all substantially as set forth.

9. In a ship or vessel having a steel deck and double bottom and a plurality of hatchways, the combination of curved metal hatches adapted to be seated on curved transverse coamings, frame members below the deck curved in continuation with the curvature of the transverse coamings, an inner skin on said frame members forming hatch chambers, protected by fenders, between the inner skin and the sides of the vessel, said inner skin being strengthened by bulkheads, girders and brackets, whereby a strong, unobstructed space, between the outer and inner skins is provided to permit of the free movement of the hatches between the coamings and the top of the double bottom, slots in the deck, screened and strengthened by longitudinal coamings, for the reception of the hatches, rack alleys projecting inwardly from the upper part of the inner skin, shafting in said alleys connected to the hatches for moving them on rollers through the slotted decks to open and close the hatchways when pulled by wire ropes actuated by suitable mechanism, all substantially as set forth.

JOSEPH R. OLDHAM.

Witnesses:
F. B. EVARTS,
J. S. MAITLAND.

---

Correction in Letters Patent No. 956,152.

It is hereby certified that in Letters Patent No. 956,152, granted April 26, 1910, upon the application of Joseph R. Oldham, of Cleveland, Ohio, for an improvement in "Ships and Ships' Hatches," an error appears in the printed specification, requiring correction as follows: Page 2, line 92, the word "holes" should read *holds;* and that the said Letters Patent should be read with this correction therein, that the same may conform to the record of the case in the Patent Office.

Signed and sealed this 26th day of July, A. D. 1910.

[SEAL.]

F. A. TENNANT,
*Acting Commissioner of Patents.*

It is hereby certified that in Letters Patent No. 956,152, granted April 26, 1910, upon the application of Joseph R. Oldham, of Cleveland, Ohio, for an improvement in "Ships and Ships' Hatches," an error appears in the printed specification, requiring correction as follows: Page 2, line 92, the word "holes" should read *holds;* and that the said Letters Patent should be read with this correction therein, that the same may conform to the record of the case in the Patent Office.

Signed and sealed this 26th day of July, A. D. 1910.

[SEAL.]
             F. A. TENNANT,
              *Acting Commissioner of Patents.*